Patented Apr. 27, 1948

2,440,360

UNITED STATES PATENT OFFICE 2,440,360

PROCESS AND CULTURE MEDIA FOR THE PRODUCTION OF PENICILLIN

Otto K. Behrens and Reuben G. Jones, Indianapolis, Ind., and Joseph W. Corse, Altadena, Calif., assignors to Eli Lilly and Company, Indianapolis, Ind., a corporation of Indiana No Drawing. Application August 12, 1947, Serial No. 768,274

9 Claims. (Cl. 195—36)

This invention relates to penicillin and more particularly to improvements in the production thereof.

An object of this invention is to provide a process whereby the production and yield of penicillin may be improved. Other objects will be apparent from the disclosures herein made.

Penicillin, a material produced by a Penicillium mold of the notatum-chrysogenum group, has become widely known within recent years for its remarkable therapeutic properties as an antibacterial agent.

The availability of penicillin has been retarded by the circumstances of its production. The penicillin formed, presumably as a metabolic product, by the growth of mold under suitable conditions, has been produced slowly and in very small quantity. Furthermore, the mold has produced other products chemically similar to penicillin, but without potent antibacterial properties. Thus the small quantity of penicillin and the presence of structurally similar compounds has rendered its isolation difficult.

One of the methods which has been employed commercially for the production of penicillin is that known as surface culture. In a common adaptation of this method a liquid nutrient medium is supplied to a large number of bottles which are supported in a substantially horizontal position. The nutrient medium is then inoculated with the Penicillium mold and the mold grows on the surface of the nutrient medium. In order to produce commercial quantities of penicillin by this method a large number of bottles is required and individual handling is necessary.

Another process which has been commercialized to some extent is that known as the bran process wherein Penicillium mold is grown on bran. The bran may be spread in thin layers on trays or may be agitated continuously in rotating drums. While the bran itself is a nutrient for the growth of the mold, it is common to associate additional nutrient materials therewith.

Probably the most widely used process at the present time for the production of penicillin is that ordinarily referred to as submerged or deep culture. The submerged culture process involves the growth of Penicillium mold in an aqueous nutrient medium and accompanied customarily by agitation. When the submerged culture process is carried out in small vessels such as flasks of relatively small capacity, the process is frequently referred to as the "shake" culture process because the agitation is brought about by continuously shaking the culture by suitable mechanical means. When containers of larger capacity are employed, and such containers may have capacities running into the thousands of gallons, the agitation of the liquid nutrient medium is ordinarily accomplished in part by mechanical stirring and in part by aeration, which latter functions primarily to supply oxygen for the growth of the mold.

All of the above processes have been characterized in general by the slow production, and low yield, of penicillin.

By this invention the production of penicillin by a Penicillium mold of the notatum-chrysogenum group may be accelerated and the yield of penicillin increased.

According to the present invention penicillin is produced by growing a Penicillium mold of the notatum-chrysogenum group in a culture medium in the presence of a compound represented by the general formula

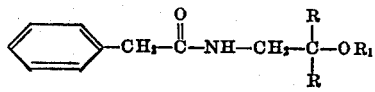

wherein each R represents a member of the group consisting of hydrogen, methyl and ethyl, and $R_1$ represents a member of the group consisting of methyl, ethyl, propyl and isopropyl. According to a preferred method, the Penicillium mold and one or more of the phenylacetyl ethers as described above are associated with an aqueous culture medium containing nutrient material suitable for the growth and development of the mold, and the mold is grown under penicillin-producing conditions. The phenylacetyl compound of the group described above is incorporated in the nutrient material in effective amount less than about 1 percent, and preferably less than about 0.3 percent. The amount of material which accelerates the production of penicillin may accordingly be present in relatively small amount although over a substantial range. For example, the method has been effectively carried out by associating about 0.015 percent of N-(2-methoxyethyl)-phenylacetamide and the Penicillium mold with a culture medium containing mold-growth-supporting material.

In another aspect there is provided by this invention a culture medium comprising mold-growth-supporting material and a phenylacetyl compound as set forth in the next preceding paragraph. In a preferred form the culture medium may comprise water, mold-growth-supporting material, and, in amount effective to accelerate the production of penicillin and less than about 1 percent and preferably less than about 0.3 percent, a compound as described above. The amount of the compound which accelerates the production of penicillin may vary substantially throughout the range indicated above. By way of example, the culture medium may contain about 0.015 percent of N-(2-methoxyethyl)-phenylacetamide.

The phenylacetyl ether compounds employed in this invention are novel per se and are disclosed in detail and claimed in copending application Serial No. 612,536, filed August 24, 1945. This invention will now be described in detail in its present preferred application to the submerged culture process of producing penicillin.

In the submerged culture process, the culture medium comprises water and mold-growth-supporting material. The mold-growth-supporting material is a nutrient material and may consist of ingredients known to those skilled in the art. A prominent constituent of one type of suitable nutrient is that known as corn steep solids which is a by-product obtained in the manufacture of corn starch. Corn steep solids is a desirable material because of its low cost and its effectiveness in bringing about a relatively high yield of penicillin. On the other hand corn steep solids is of indeterminate chemical composition, some ingredients of which may make more difficult the isolation of the penicillin produced during the growth of the mold. With a major constituent such as corn steep solids there are ordinarily associated additional ingredients known to the art such as corn sugar, lactose, and salts such as calcium carbonate and zinc sulfate. The exact function of the various ingredients is not known in detail, but it is known to those skilled in the art that the combination of such ingredients does bring about the production of penicillin when a Penicillium mold of the notatum-chrysogenum group is grown in such a culture medium under suitable conditions.

Another type of aqueous culture medium includes water and nutrient substances which as contrasted with corn steep solids are of a determinate chemical composition. Such ingredients include lactose, dextrose, acetic acid and salts such as sodium nitrate, ammonium nitrate, potassium dihydrogen phosphate, and magnesium sulfate. Compositions of this type are advantageous in that penicillin frequently is more readily separated from the other constituents of the culture medium and other products of the growth of the mold.

The mold employed for the production of penicillin is a Penicillium mold of the notatum-chrysogenum group, and illustratively a strain of this mold suitable for the purposes of this invention is that known as strain N. R. R. L. 1976.

As examples of compounds which may be employed for the purposes of this invention to accelerate the production of penicillin and which come within the scope of the structural formula given above may be mentioned N-(2-methoxyethyl)-phenylacetamide, N-(2-ethoxyethyl)-phenylacetamide, N-(2-methoxybutyl)-phenylacetamide and N-(2-n-propoxyethyl)-phenylacetamide.

The amounts of the phenylacetyl compounds employed in carrying out this invention may vary to a substantial extent. In general the effective amount of the phenylacetyl compound ranges up to about 10 g. per liter of culture medium or in other words about 1 percent on a weight-volume basis, although generally it is preferred to employ the phenylacetyl compound in amounts less than about 0.3 per cent. The present optimum range is about 0.015 to 0.02 percent and in general there is no particular advantage to be gained by employing amounts of the phenylacetyl compounds in substantial excess of the amount effective in promoting the production of penicillin by the mold.

The phenylacetyl compound may be associated with the mold and culture medium at any suitable time. Thus the materials of the culture medium upon association in a suitable container may be inoculated with the Penicillium mold, and the phenylacetyl compound may be incorporated either before or shortly after the inoculation with the mold.

The culture medium, with the mold, and the compound accelerating the production of penicillin, should be maintained at a suitable temperature, for example in the range of 20–30° C. A range of temperature which has been found to be particularly suitable is from 24–28° C. The period of time during which the mold is grown will depend upon the objective desired. Thus the mold may be grown only during the period of its maximum rate of growth. Under such conditions the mold growth may be interrupted after a period of growth of from two to three days. On the other hand the mold may be grown to obtain the maximum yield of penicillin. In such case the mold may be grown for a longer period, for example for about four or five days.

The penicillin may be separated from the culture medium in any suitable manner. For example the penicillin may be adsorbed on a surface-active carbon. Alternatively the penicillin may be extracted by means of a suitable water-immiscible organic solvent such as amyl acetate. By well-known extractive procedures, the penicillin subsequently may be isolated in dry form as a salt thereof, for example the sodium or calcium salt.

By the practice of this invention the yield of penicillin has been substantially increased. Thus under comparative conditions the yield of penicillin has been increased from 30 to upwards of 80 percent. This range is of course illustrative and lesser or greater yields are within the contemplation of the invention depending upon the conditions under which the penicillin is produced.

Specific examples further illustrating the invention particularly with respect to the deep culture process of producing penicillin are given below.

Example 1

A culture medium may be prepared comprising the following constituents:

| | | |
|---|---|---|
| Corn steep solids | pounds | 500 |
| Corn sugar | do | 125 |
| Lactose | do | 500 |
| Calcium carbonate | do | 50 |
| Water | gallons | 3,000 |

To the above culture medium are added about three pounds of N-(2-methoxyethyl)-phenylacetamide equivalent on a weight-volume basis to 0.015 percent. The culture medium is inoculated with a Penicillium mold, strain N. R. R. L. 1976, and the mold is allowed to grow for 4 days at 27° C.

An increase in the amount of penicillin is accomplished by carrying out the production of penicillin in accordance with this invention, as compared with the amount of penicillin produced by the mold in the above culture medium, but in the absence of N-(2-methoxyethyl)-phenylacetamide.

Example 2

A culture medium is prepared as follows:

| | | |
|---|---|---|
| Lactose | Grams | 35 |
| Corn steep solids | do | 20 |
| Calcium carbonate | do | 2 |
| Zinc sulfate heptahydrate | do | 0.004 |
| M/50 phosphate buffer | cc | 5 |
| Water, q. s. | | 1,000 |

0.16 g. of N-(2-methoxybutyl)-phenylacetamide, namely 0.016 percent on a weight-volume basis, are added to the culture medium and the medium inoculated with a Penicillium mold, strain N. R. R. L. 1976. The culture medium and mold are agitated continuously and the mold permitted to grow for four days at 27° C. There is obtained penicillin in an amount as great as 158 Oxford units per cc. of culture medium.

By way of comparison, when the Penicillium mold is grown under the same conditions but in the absence of the N-(2-methoxyethyl)-phenylacetamide the yield of penicillin may not exceed 104 Oxford units per cc. of culture medium.

In the above example "corn steep solids" has been included as a constituent of the culture medium. Corn steep solids assist in the obtaining of high yields of penicillin, but due in part to the heterogeneous nature of corn steep solids difficulty is involved in the separation of penicillin from other constituents of the culture medium following the growth of the mold.

In the example to follow the culture medium does not contain corn steep solids and is of more precise chemical composition. The employment of such culture medium may result in the production of a lower yield of penicillin. On the other hand, penicillin which is produced may be considerably more readily separated from the culture medium following the growth of the mold.

Example 3

A culture medium not embodying corn steep solids is as follows:

| | | |
|---|---|---|
| Water | cc | 1,000 |
| Lactose | grams | 25.0 |
| Dextrose | do | 5.0 |
| Sodium nitrate | do | 5.0 |
| Ammonium nitrate | do | 5.0 |
| Potassium dihydrogen phosphate | do | 1.0 |
| Magnesium sulfate | do | 0.25 |
| Acetic acid | do | 5.0 |
| Zinc sulfate heptahydrate | do | 0.04 |
| Calcium sulfate heptahydrate | do | 0.005 |
| Ferrous sulfate heptahydrate | do | 0.2 |

0.15 g. of N-(2-methoxyethyl)-phenylacetamide, namely 0.015 percent on a weight-volume basis were added for the purposes of this invention and the culture medium inoculated with Penicillium mold strain N. R. R. L. 1976. The mixture was mechanically agitated and maintained at a temperature of about 27° C. for six days. At this time the penicillin had been produced to the extent of about 34 Oxford units per cc. of culture medium.

By way of comparison, a medium containing no N-(2-methoxyethyl)-phenylacetamide but otherwise the same and maintained under the same conditions for six days produced penicillin to the extent of a concentration of only 26 Oxford units per cc. of culture medium.

Increases in penicillin production comparable to those obtained in the foregoing examples may be obtained by the use in culture media of the other novel phenylacetyl ethers described in this application.

As previously mentioned the compounds to be employed in carrying out this invention are novel. Copending application Serial No. 612,536, filed August 24, 1946, discloses the novel compounds and broadly discloses their novel utility. The present application is a continuation-in-part of application Serial No. 612,538, filed August 24, 1945. For purposes of convenience, an illustrative method of preparation of these compounds is given below.

Preparation of N-(2-methoxyethyl)-phenylacetamide 20.8 g. of a 72 percent solution of 2-methoxyethylamine in water is cooled to about 0° C., stirred vigorously, and 17 g. of phenylacetyl chloride added thereto over a period of about one half hour. The reaction is extracted with ether whereby the N-(2-methoxyethyl)-phenylacetamide is obtained in solution. The ether solution is washed with dilute hydrochloric acid, dilute sodium hydroxide solution and water and dried with anhydrous sodium sulfate. Upon evaporation of the ether under reduced pressure, the N-(2-methoxyethyl)-phenylacetamide is obtained in substantially pure form as a clear colorless liquid. Analysis has shown the presence of 6.93 percent nitrogen as compared with a calculated value of 7.25 percent.

We claim:

1. The method of producing penicillin in submerged culture which comprises growing a Penicillium mold of the notatum-chrysogenum group in a culture medium in the presence of an effective amount less than about one percent of a compound represented by the following formula:

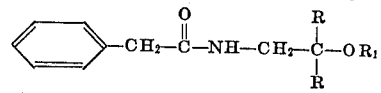

wherein each R represents a member of the group consisting of hydrogen, methyl and ethyl, and $R_1$ represents a member of the group consisting of methyl, ethyl, propyl and isopropyl.

2. In the method of producing penicillin in submerged culture by growing a Penicillium mold of the notatum-chrysogenum group in association with a nutrient material, the improvement which comprises incorporating in the nutrient material an effective amount less than about one percent of a compound represented by the formula

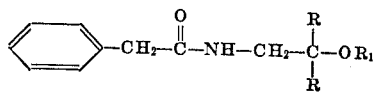

wherein each R represents a member of the group consisting of hydrogen, methyl and ethyl, and $R_1$ represents a member of the group consisting of methyl, ethyl, propyl and isopropyl.

3. The improved method of obtaining penicillin in submerged culture which comprises providing an aqueous culture medium for the growth and development of a Penicillium mold of the notatum-chrysogenum group, associating with said culture medium a Penicillium mold of the notatum-chrysogenum group and an effective amount less than about one percent of a compound represented by the formula

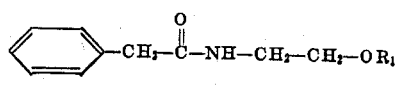

wherein $R_1$ represents a member of the group consisting of methyl, ethyl, propyl and isopropyl.

4. The improved method of producing penicillin in submerged culture which comprises providing a culture medium containing nutrient material and associating with said culture medium a Penicillium mold of the notatum-chrysogenum group and an effective amount less than about one percent of N-(2-methoxyethyl)-phenylacetamide.

5. The improved method of producing penicillin in submerged culture which comprises providing a culture medium containing nutrient material and associating with said culture medium a Penicillium mold of the notatum-chrysogenum group and an effective amount less than about one percent of N-(2-ethoxyethyl)-phenylacetamide.

6. A culture medium for the production of penicillin in submerged culture through the growth of a Penicillium mold of the notatum-chrysogenum group, said culture medium comprising nutrient material and containing an effective amount less than about one percent of a compound represented by the formula

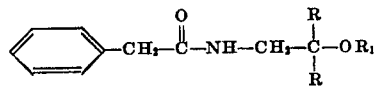

wherein each R represents a member of the group consisting of hydrogen, methyl and ethyl, and $R_1$ represents a member of the group consisting of methyl, ethyl, propyl and isopropyl.

7. A culture medium for the production of penicillin in submerged culture through the growth of a Penicillium mold of the notatum-chrysogenum group, said culture medium comprising nutrient material and containing an effective amount less than about one percent of a compound represented by the formula

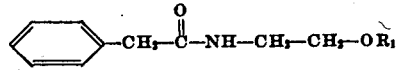

wherein $R_1$ represents a member of the group consisting of methyl, ethyl, propyl and isopropyl.

8. A culture medium for the production of penicillin in submerged culture through the growth of a Penicillium mold of the notatum-chrysogenum group, said culture medium comprising water, nutrient material dispersed in said water, and containing an effective amount less than about one percent of N-(2-ethoxyethyl)-phenylacetamide.

9. A culture medium for the production of penicillin in submerged culture through the growth of a Penicillium mold of the notatum-chrysogenum group, said culture medium comprising water, nutrient material dispersed in said water, and containing an effective amount less than about one percent of N-(2-ethoxyethyl)-phenylacetamide.

OTTO K. BEHRENS.
REUBEN G. JONES.
JOSEPH W. CORSE.